United States Patent
Jach et al.

(10) Patent No.: US 6,568,736 B2
(45) Date of Patent: May 27, 2003

(54) COLLAPSIBLE VEHICLE SEAT ASSEMBLIES

(75) Inventors: Roman Jach, Westland, MI (US); Michelle Girolamo, Livonia, MI (US); Chuck Patterson, Rockwood, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/184,699

(22) Filed: Jun. 28, 2002

(65) Prior Publication Data

US 2003/0006637 A1 Jan. 9, 2003

Related U.S. Application Data

(63) Continuation of application No. 09/770,573, filed on Jan. 26, 2001, now Pat. No. 6,499,787.
(60) Provisional application No. 60/220,943, filed on Jul. 26, 2000.

(51) Int. Cl.[7] ................................................. B60N 2/02
(52) U.S. Cl. ................................ 296/65.09; 296/65.01; 296/65.05; 296/65.16; 296/69; 297/378.12; 297/336
(58) Field of Search ........................... 296/65.01, 65.05, 296/65.16, 69, 65.09; 297/378.12, 378.1, 336

(56) References Cited

U.S. PATENT DOCUMENTS

| | | |
|---|---|---|
| 4,771,507 A | 9/1988 | Draplin et al. |
| 4,805,953 A | 2/1989 | Yamauchi |
| 4,932,706 A | 6/1990 | Wainwright et al. |
| 4,932,709 A | 6/1990 | Wainwright |
| 4,979,773 A | 12/1990 | Eubank |
| 5,011,210 A | 4/1991 | Inoue |
| 5,195,795 A | 3/1993 | Cannera et al. |
| 5,482,349 A | 1/1996 | Richter et al. |
| 5,492,386 A | 2/1996 | Callum |
| 5,527,087 A | 6/1996 | Takeda et al. |
| 5,570,931 A | 11/1996 | Kargilis et al. |
| 5,588,707 A | 12/1996 | Bolsworth et al. |
| 5,681,077 A | 10/1997 | Hashimoto |
| 5,685,608 A | 11/1997 | Yamazaki |
| 5,730,496 A | 3/1998 | Hashimoto |
| 5,868,451 A | 2/1999 | Uno et al. |
| 5,879,053 A | 3/1999 | Lux et al. |
| 5,904,404 A | 5/1999 | McCulloch et al. |
| 5,941,602 A | 8/1999 | Sturt et al. |
| 5,954,398 A | 9/1999 | Nambra et al. |
| 5,975,612 A | 11/1999 | Macey et al. |
| 6,000,742 A | 12/1999 | Schaefer et al. |
| 6,012,755 A | 1/2000 | Hecht et al. |
| 6,030,038 A | 2/2000 | Nambra et al. |
| 6,070,934 A | 6/2000 | Schaefer et al. |
| 6,106,046 A | 8/2000 | Reichel |
| 6,113,172 A | 9/2000 | Chaloult et al. |
| 6,113,187 A | 9/2000 | Sugiyama et al. |
| 6,174,030 B1 | 1/2001 | Matsuo |
| 6,183,033 B1 | 2/2001 | Arai et al. |
| 6,199,951 B1 | 3/2001 | Zeile et al. |
| 6,234,553 B1 | 5/2001 | Eschelbach et al. |
| 6,293,603 B1 | 9/2001 | Waku et al. |

Primary Examiner—D. Glenn Dayoan
Assistant Examiner—Lori L Coletta
(74) Attorney, Agent, or Firm—Bill C. Panagos

(57) ABSTRACT

A collapsible seat assembly includes first and second risers supported on a vehicle floor. The first and second movable supports are pivotally connected to the first and second risers, respectively, by first and second parallelogram linkages. Each movable support has a front end and a rear end. A lower seat cushion pan is pivotally connected to the front ends of the movable supports. A seat back and recliner mechanism is pivotally connected to the rear ends of the movable supports. The lower seat cushion pan and seat back are pivotally collapsible forward to substantially horizontal positions in which they are substantially flush and parallel with each other to maximize cargo space in the vehicle.

10 Claims, 13 Drawing Sheets

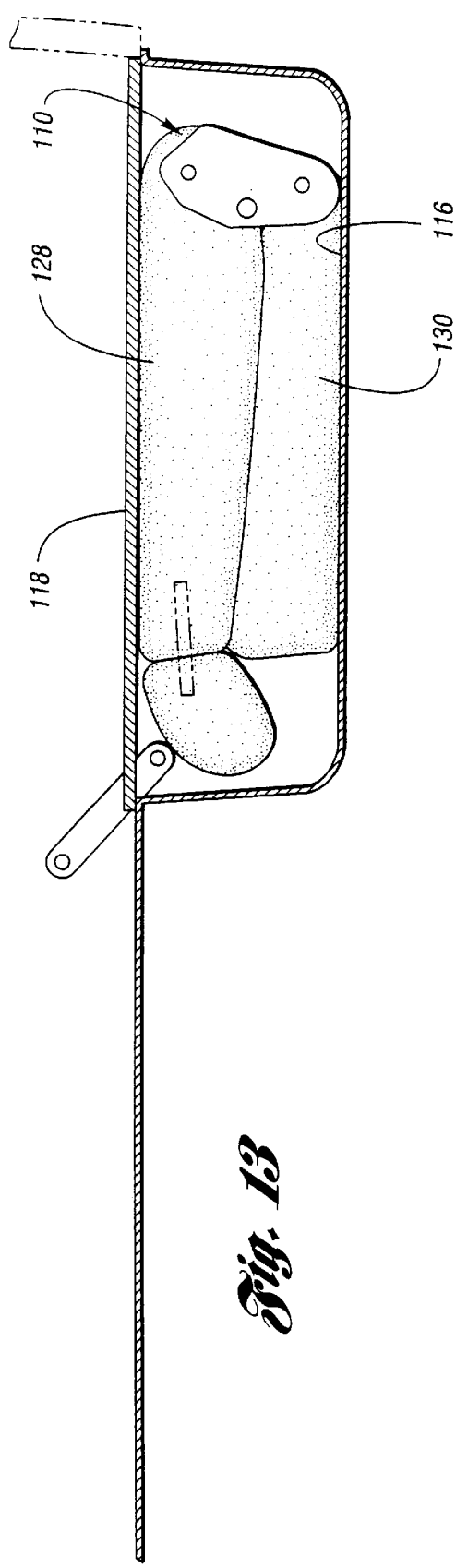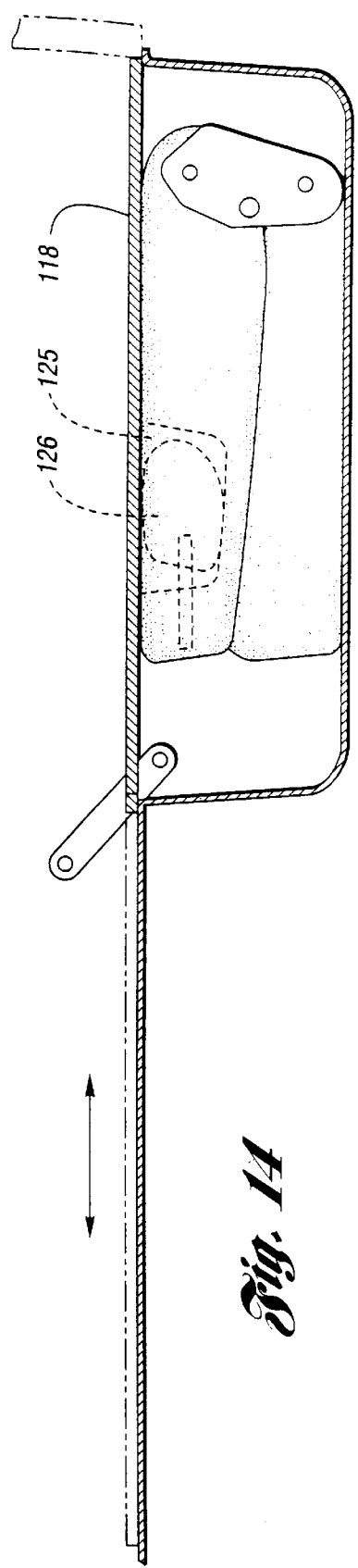
Fig. 13
Fig. 14

COLLAPSIBLE VEHICLE SEAT ASSEMBLIES

A continuation application under 37 C.F.R. §1.53(b) of prior application Ser. No. 09/770,573 filed on Jan. 26, 2001 now U.S. Pat. No. 6,499,787, which claims the benefit of provisional application Ser. No. 60/220,943 filed Jul. 26, 2000, entitled COLLAPSIBLE VEHICLE SEAT ASSEMBLIES.

BACKGROUND OF THE INVENTION

1. Field of the Invention

The present invention relates to collapsible vehicle seat assemblies which are collapsible to low, flat positions within the vehicle to increase cargo storage space within the vehicle.

2. Background Art

Minivans of current design have relatively small cargo volume behind the last row of seats when all of the seats are in place. To enlarge this volume, the vehicle seats can be disconnected and removed. This type of seating system is disadvantageous because it is necessary to disassemble, i.e., disconnect the individual vehicle seats from their anchored positions in the vehicle floor and to store the vehicle seats that have been removed, outside the vehicle and these seats must be re-attached when additional passenger seating is required. As a result, the vehicle can be adapted only by expending considerable time to adapt to changing needs regarding passenger capacity and cargo volume.

Some existing minivans include stowable seats which are the fold-and-tumble type and can sometimes be removed from the vehicle. Their seat backs collapse forward and then the entire seat assembly tips upward and forward 90° and sits up against the backs of the front seats. This provides more cargo space, but the seat still takes up some fore-aft cargo room.

Accordingly, it is desirable to provide an improved stowable minivan seat assembly in which cargo storage capacity is increased. Specifically, it is desirable that cargo storage space be available up to the backs of the front seats.

SUMMARY OF THE INVENTION

In a preferred embodiment of the invention, the seat assembly reconfigures in such a way that cargo room is available up to the backs of the front seats. In the reconfigured (collapsed) position, the surfaces of the cushion and back which face up when in the stowed position form a vehicle load floor.

A collapsible seat assembly in accordance with the invention includes first and second risers supported on a vehicle floor. First and second movable supports are pivotally connected to the first and second risers, respectively, by first and second parallelogram linkages. Each movable support has a front end and a rear end. A lower seat cushion pan is pivotally connected to the front ends of the movable supports. A seat back and recliner mechanism are pivotally connected to the rear ends of the movable supports. The lower seat cushion pan and seat back are pivotally collapsible forward to substantially horizontal positions to maximize cargo space in the vehicle.

Another aspect of the invention provides a vehicle seat assembly for a vehicle floor which includes a stowage cavity formed therein. A collapsible seat is pivotally connected to the vehicle and positioned on the vehicle floor adjacent the stowage cavity. The collapsible seat is pivotable from an upright position into a collapsed position within the stowage cavity. A sliding cover is positioned on the vehicle floor and selectively slidable between a first position beneath the collapsible seat when the collapsible seat is in the upright position and a second position covering the stowage cavity. The sliding cover is operative as a vehicle load floor when in the second position.

Accordingly, an object of the invention is to provide a vehicle seat assembly for a minivan which is collapsible to a position which allows cargo storage space up to the backs of the front seats.

Another object of the invention is to provide a vehicle seat assembly which maximizes cargo storage space within a minivan.

A further object of the invention is to provide a collapsible vehicle seat assembly which includes a seat back which may be dumped to a table position.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 13 shows the seat assembly of FIG. 11 collapsed into the stowage cavity; and FIG. 14 shows a third alternative embodiment corresponding with that of FIG. 13, wherein a headrest storage pocket is provided on the seat back.

DETAILED DESCRIPTION OF THE PREFERRED EMBODIMENT(S)

The first aspect of the invention relates to a stowable second row mini-van seat, and is described below with reference to FIGS. 1–10. The second row mini-van seat is reconfigurable (collapsible) and will stow in a low, flat position against a vehicle floor in order to achieve as much as cargo room as possible without having to remove the seat.

The seat can also be stowed either above or below (i.e. recessed into) the vehicle load floor, depending on the floor pan type. The backs of the lower seat and seat back form the load floor when the seat assembly is collapsed.

With the present invention, the seat reconfigures in such a way that cargo room is available up to the backs of the front seats. The surfaces of the cushion and back which face up when in the stowed position are made of a durable material, preferably plastic. There is also a rotation stop to make sure the lower seat cushion and seat back A-surfaces (fabric) do not lay on the floor and become soiled.

Figure 1:
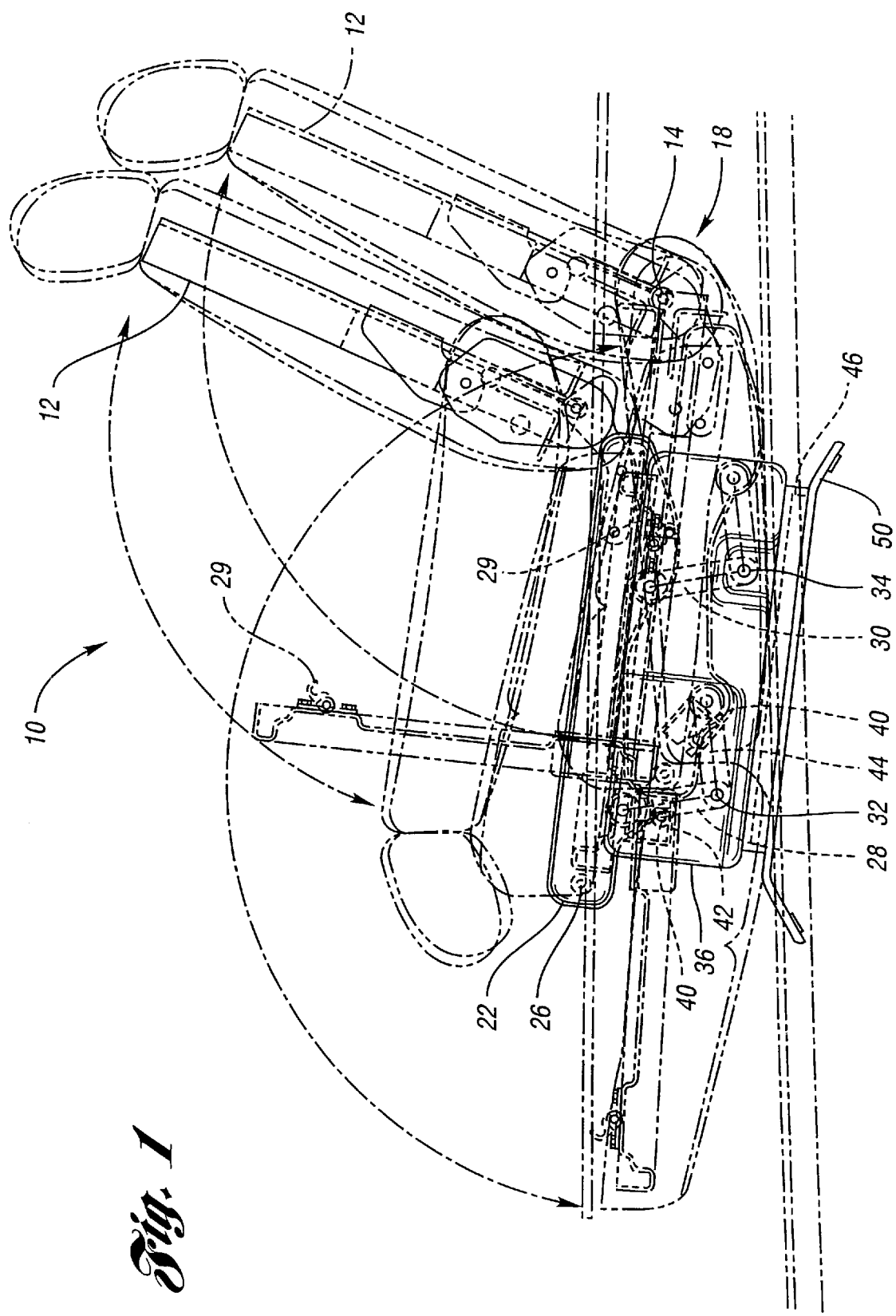
FIG. 1 shows side views in phantom of a vehicle seat assembly in accordance with a first embodiment of the invention in various positions.
Figure 2:
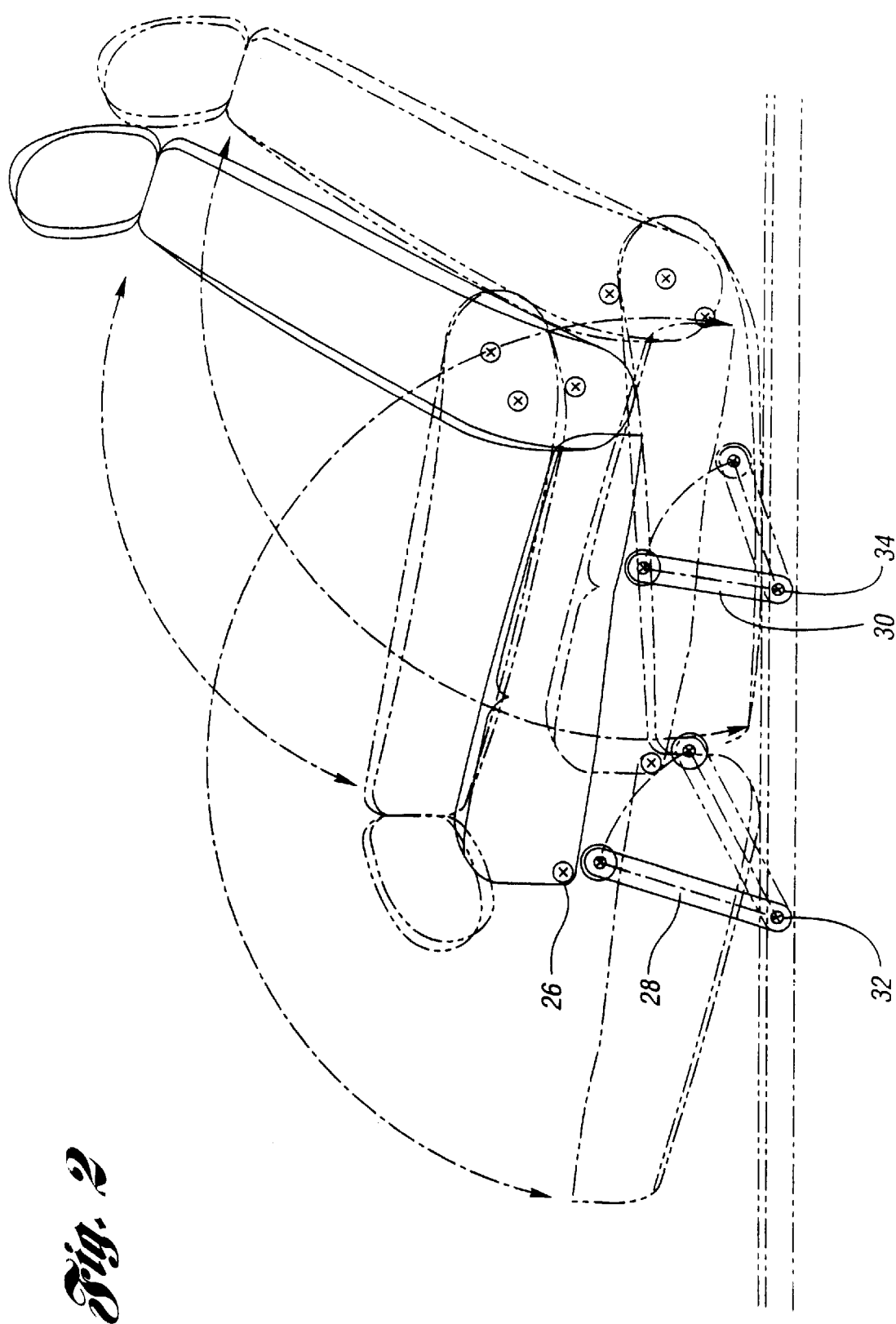
FIG. 2 shows side views of the seat assembly of FIG. 1 with the risers and tracks removed.
Figure 3:
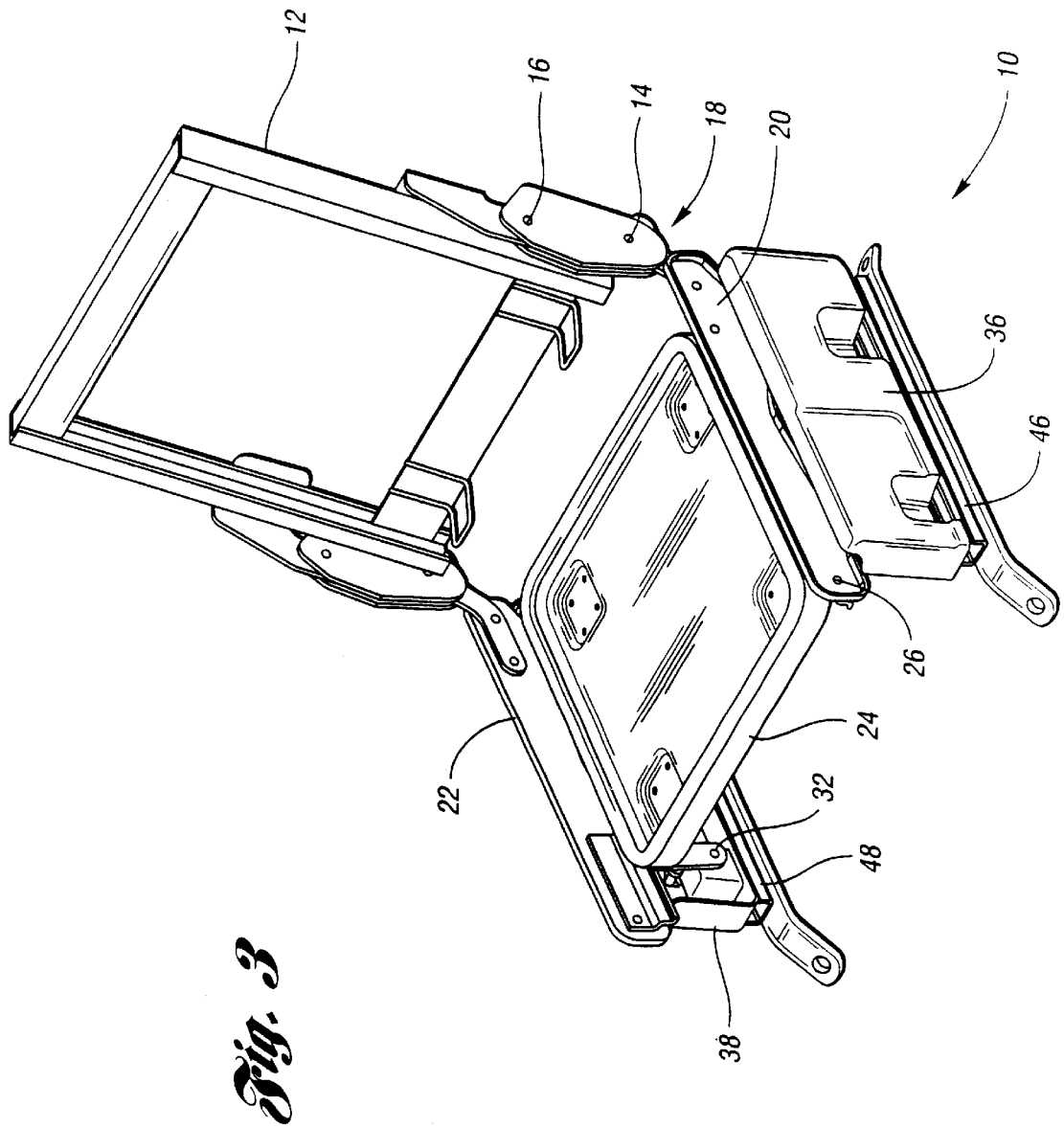
FIG. 3 shows a perspective view of the seat assembly of FIG. 1 in the design position.

FIGS. 1 and 2 illustrate the seat assembly 10 in side views illustrating various reconfigured positions between upright and stowed positions. FIG. 3 shows a perspective view of the seat assembly 10 in the design position. The structure of the seat assembly 10 will first be described with reference to FIGS. 1–3, and then the functionality of the seats will be described.

Figure 10:
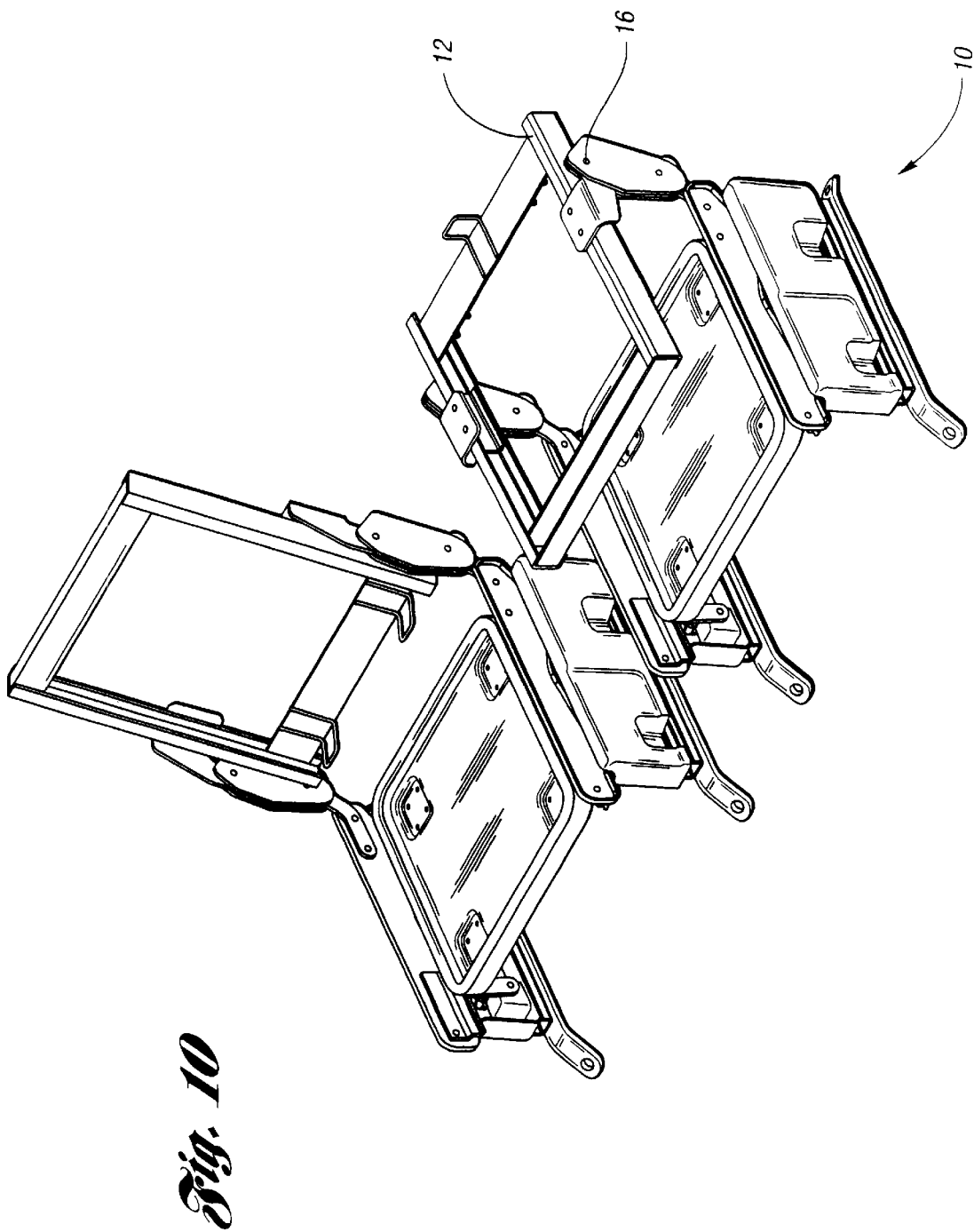
FIG. 10 shows a perspective view of two seat assemblies in accordance with the embodiment of FIG. 1, with one seat assembly having a seat back dumped to a table position.

As shown, the seat assembly 10 includes a back frame 12 which is pivotally connected about a recliner pivot joint 14 for reclining operations, and about a second pivot point 16, about which the back frame 12 may "dump" to a table position (such as that shown in FIG. 10). The back of the seat back will have an integrated plastic tray table with molded-in cup holders for use in the table position shown in FIG. 10.

The recliner portion 18 at each side of the seat back frame 12 is attached to a pair of movable upper supports 20, 22. A non-structural cushion pan 24 is also attached to the upper supports 20, 22. The forward edge of the cushion pan 24 is pivotally connected at the pivot joint 26 to the upper support 20, and similarly attached at the opposing side, for roughly 180 degrees of forward pivoting movement. The rear portion of the cushion pan 24 is attached on each side by a hook 29 which latches onto a pin protruding from each upper support 20, 22.

Figure 4:
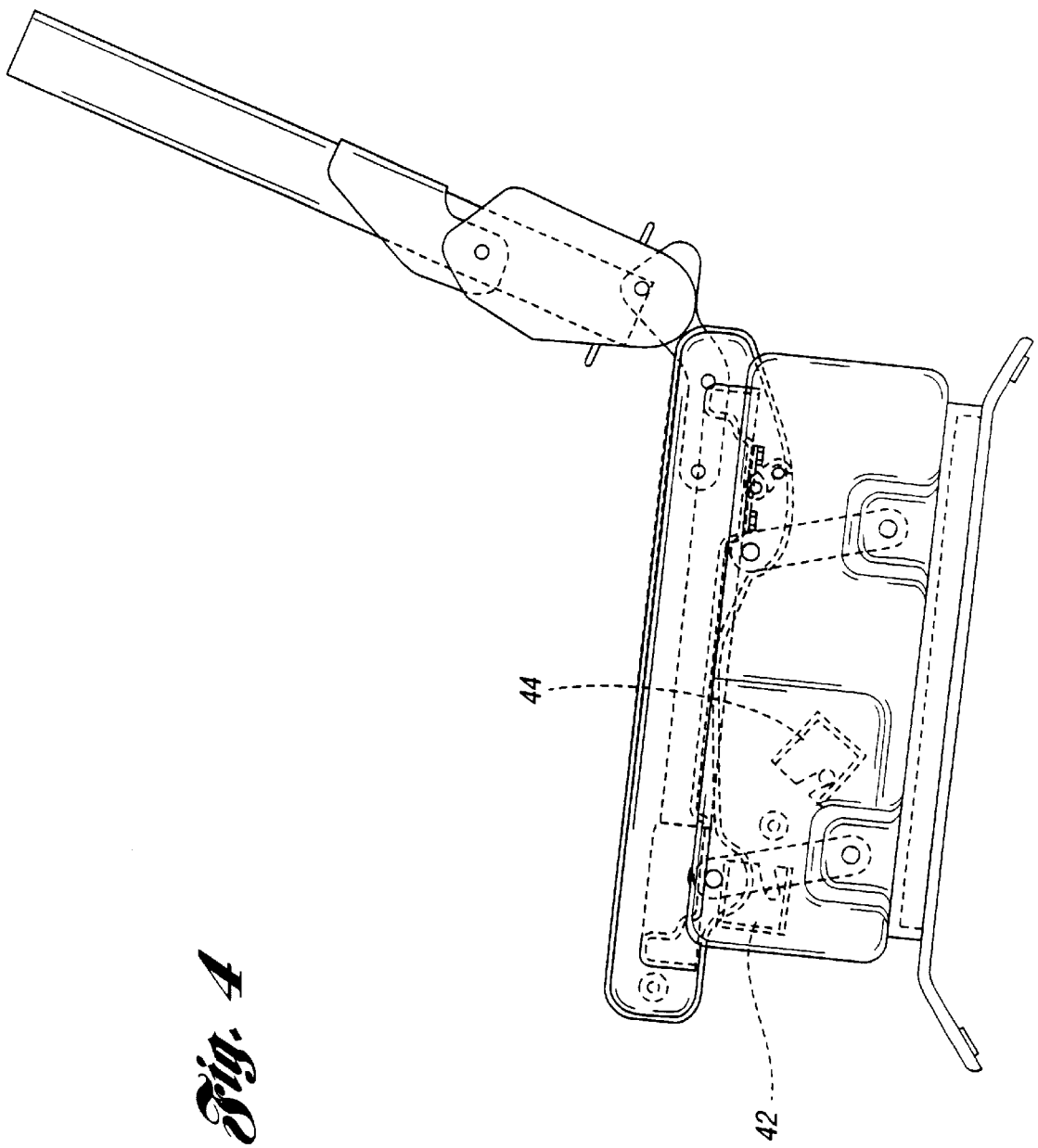
FIG. 4 shows a side view of the seat assembly of FIG. 3.
Figure 7:
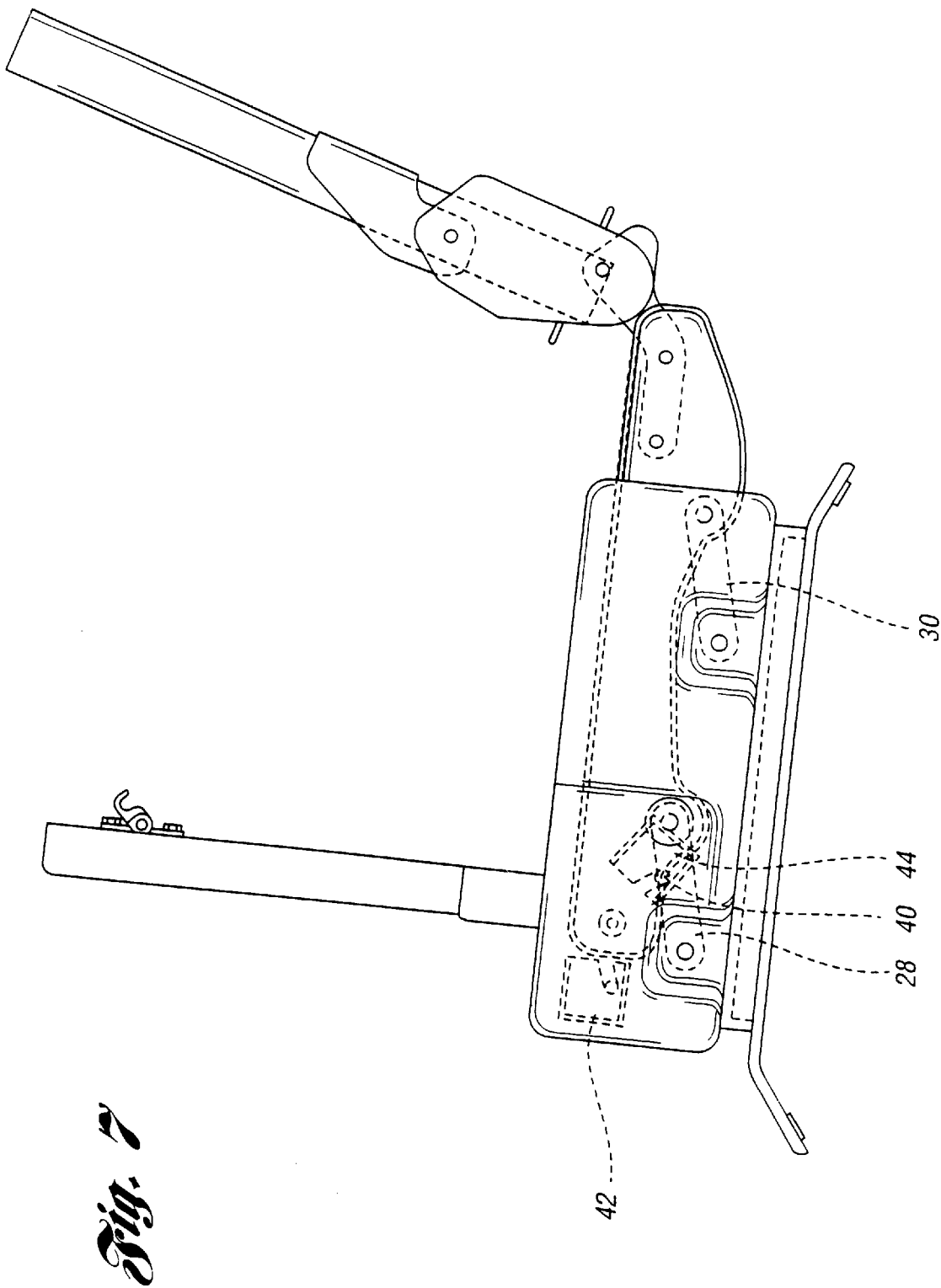
FIG. 7 shows a side view of the seat assembly of FIG. 6.

The upper supports 20, 22 are pivotally connected to four parallelogram-type linkages 28, 30 which are operative to rotate rearward and downward, as most clearly shown in FIG. 2, about the pivot points 32, 34. The pivot points 32, 34 are on the structural risers 36, 38, as shown in FIGS. 1 and 3. As shown in FIG. 1, each front linkage 28 includes a pin 40 near the upper end thereof. The pin 40 is positioned to lock within latches 42, 44, alternately, when the linkages are in the up and down positions. This engagement is shown in FIGS. 4 and 7. The latches 42, 44 are positioned on the risers 36, 38. The risers 36, 38 are attached to a pair of fore-aft tracks 46, 48. The tracks 46, 48 are bolted to the floor 50 of the vehicle.

In order to collapse the seat assembly, the occupant pulls a strap which extends from the "bite line" (the interface between the rear edge of the lower seat cushion and the lower edge of the seat back cushion) of the seat. The strap (not shown) is operative to unlatch the hooks 29 to allow pivotal movement of the cushion and cushion pan 24 from the horizontal position shown in FIG. 3, to the vertical position shown in FIGS. 5 and 6. As the cushion and cushion pan 24 are rotated forward, this rotation triggers, by cable connection, the unlocking of the latch 42 to allow pivotal movement of the front and rear linkages 28, 30.

Figure 5:
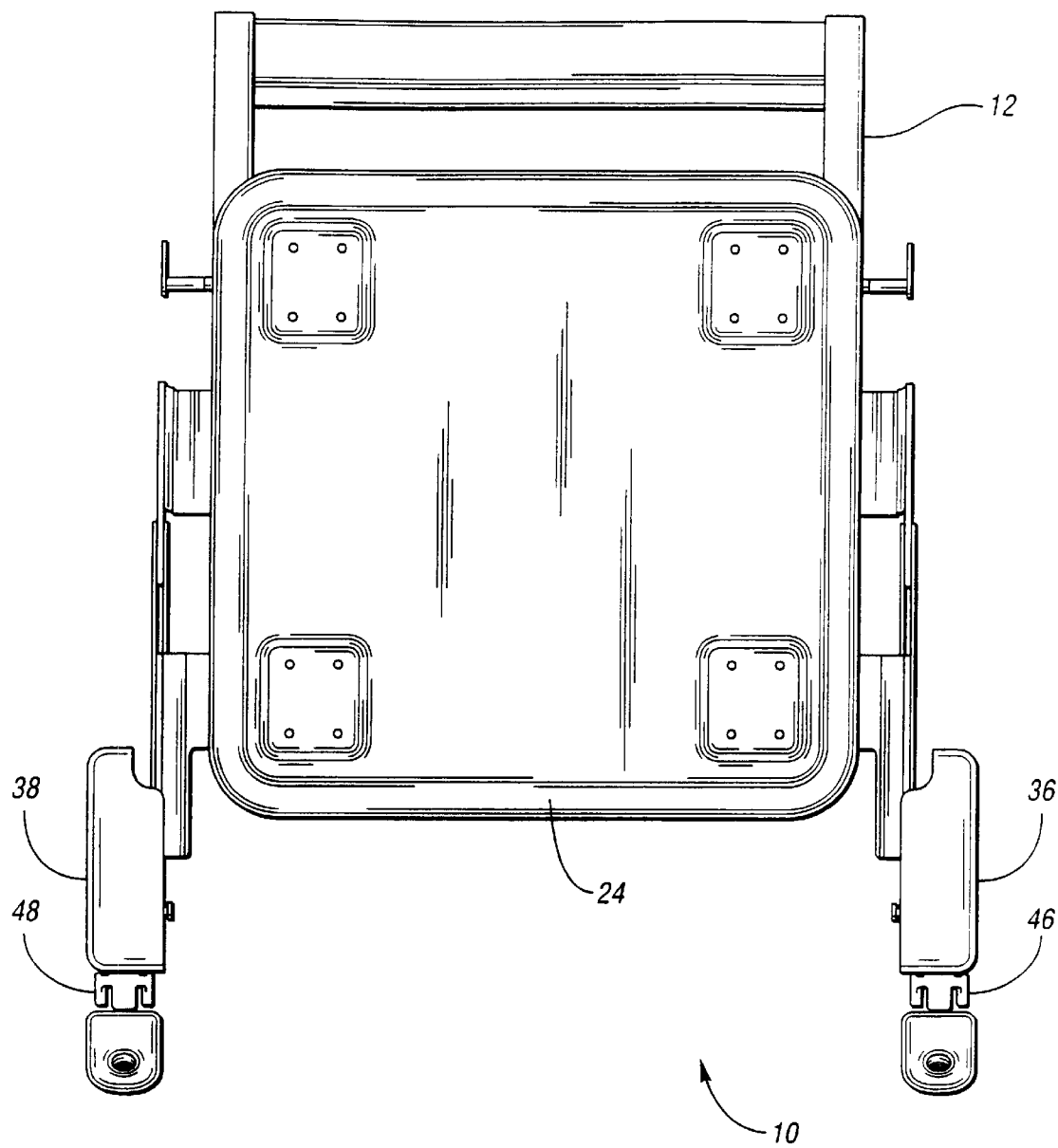
FIG. 5 shows a front view of the seat assembly of FIG. 3 with the seat back and seat cushion pan in the upright position.

FIG. 5 shows a front view of the seat assembly 10 with the cushion pan 24 in the upright position before the linkages 28, 30 begin to rotate. As shown in FIG. 5, the risers 36, 38 and tracks 46, 48 are wide enough to allow collapse of the rest of the seat assembly between the risers 36, 30 and tracks 46, 48 against the floor of the vehicle.

Figure 6:
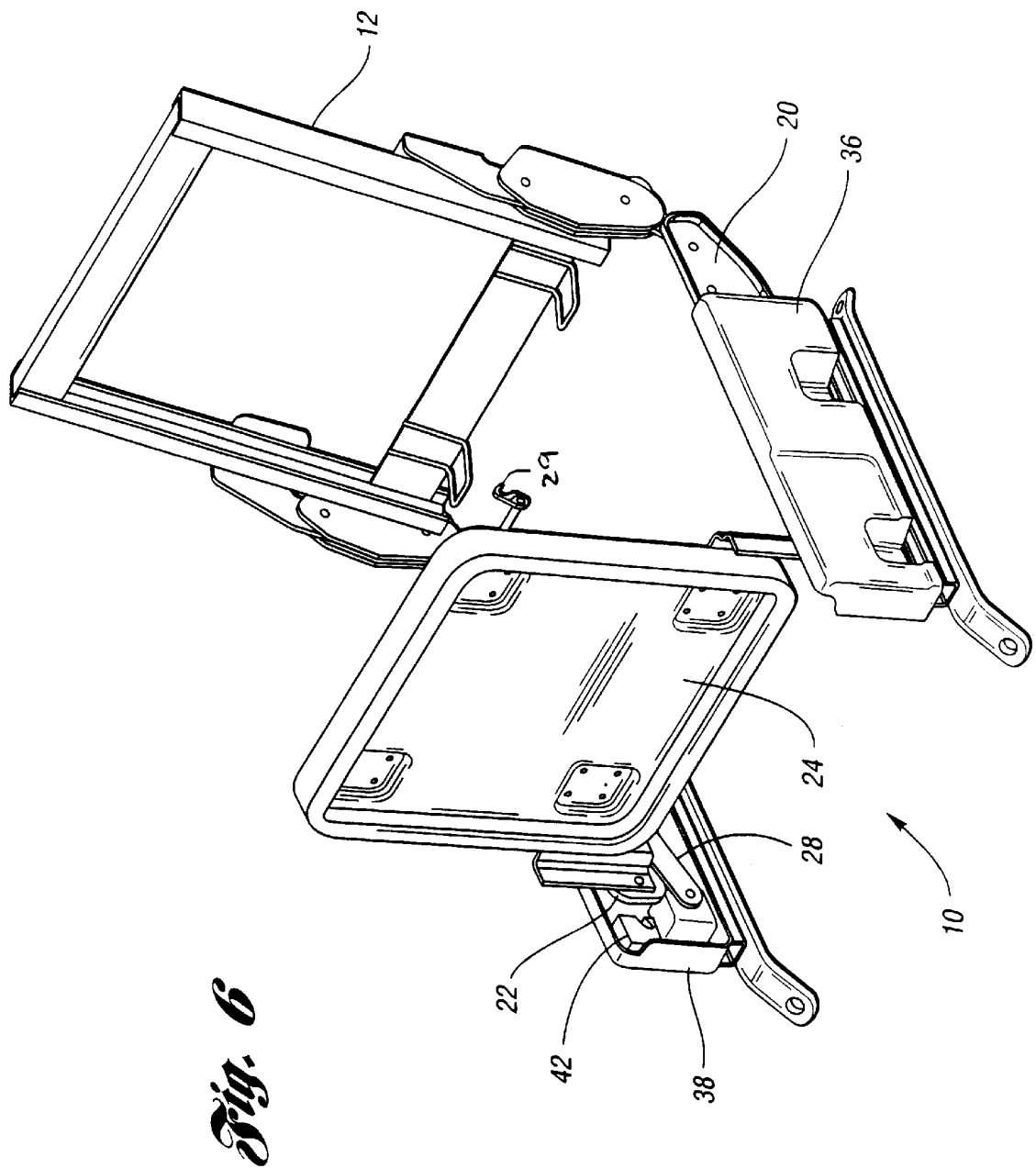
FIG. 6 shows a perspective view of the seat assembly of FIG. 5 as the linkages rotate toward a substantially horizontal position.

Turning to FIG. 6, the linkages 28, 30 continue to rotate toward a substantially horizontal position, and the upper supports 20, 22 are lowered to a position below the upper edge of the risers 36, 38. This position is also shown in FIG. 7, wherein the linkages 28, 30 have rotated to the substantially horizontal position, and the pin 40 has engaged the latch 44.

Figure 8:
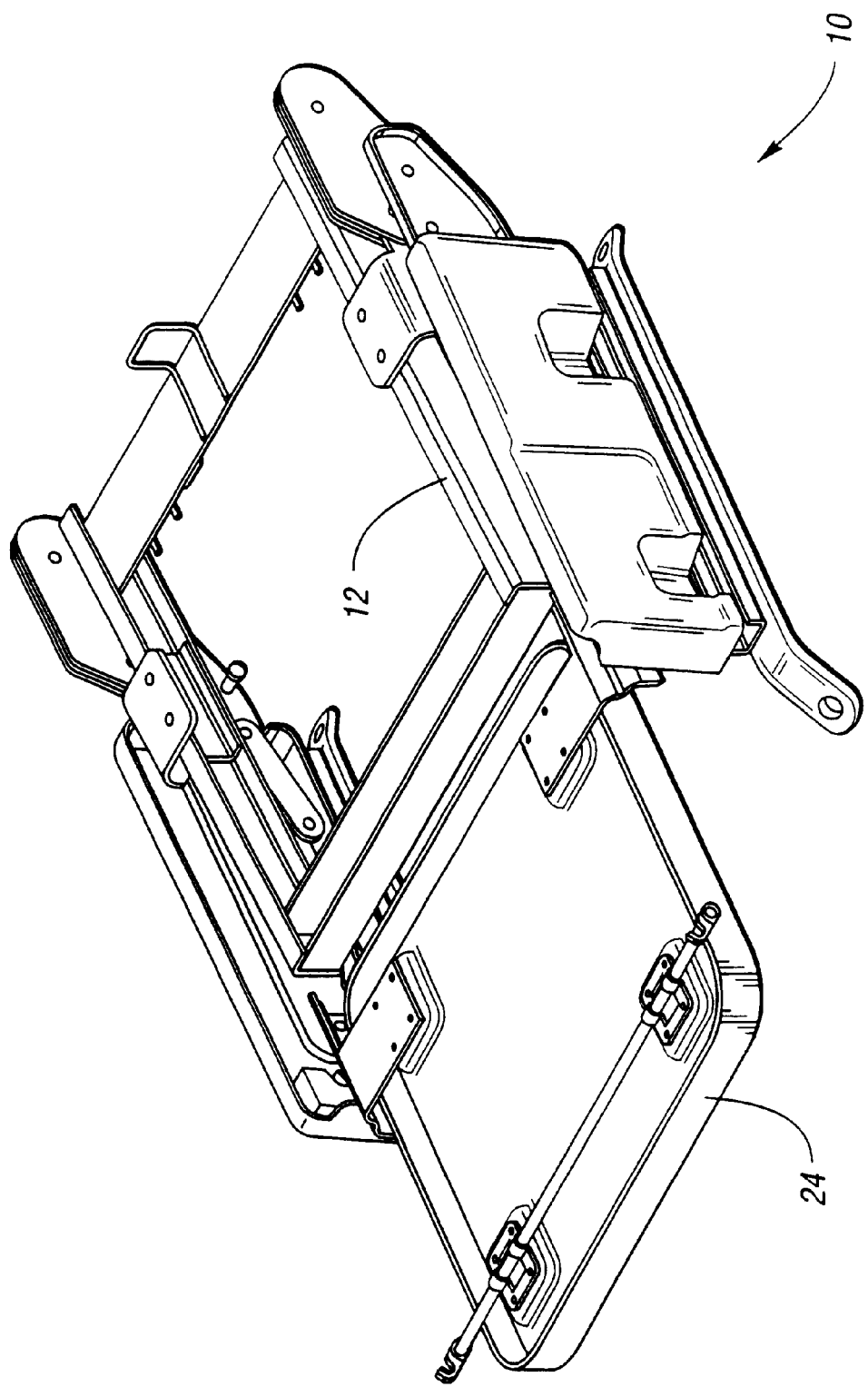
FIG. 8 shows a perspective view of the seat assembly of FIG. 7 with the cushion pan and back frame collapsed.
Figure 9:
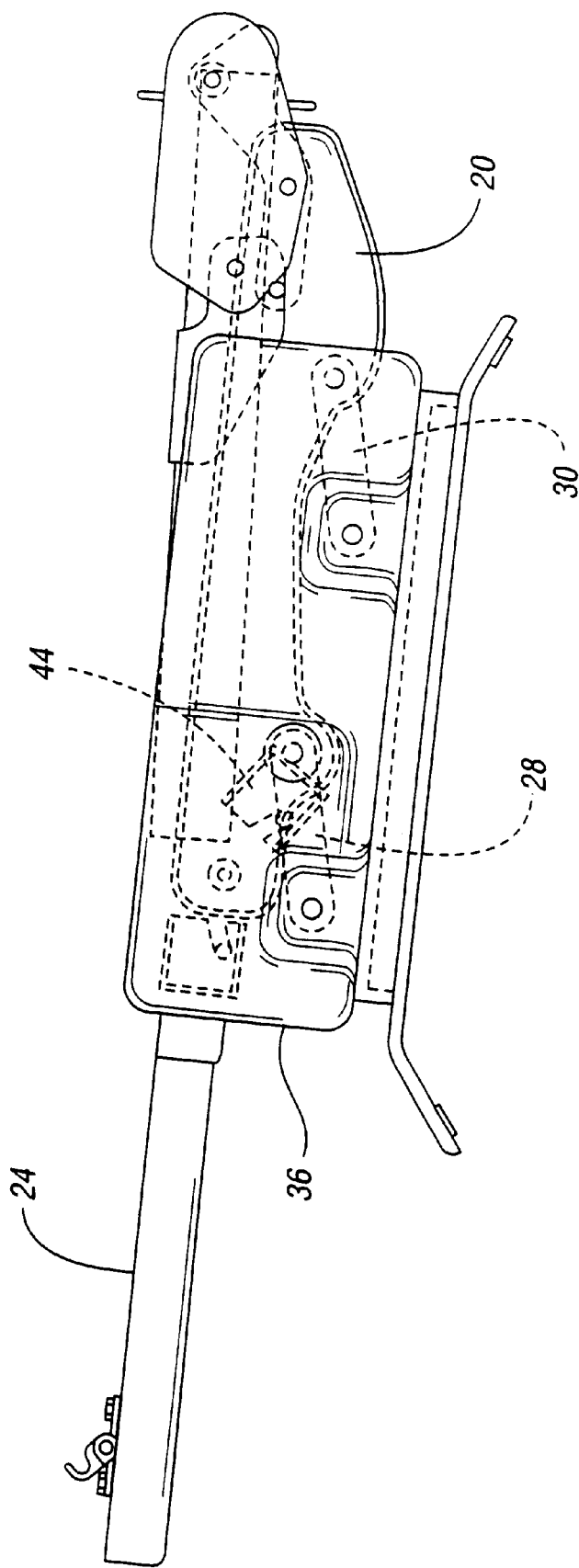
FIG. 9 shows a side view of the assembly of FIG. 8.

Between the positions of FIGS. 7 and 8, the cushion pan 24 is continued to rotate forward to the substantially flat position, and the back frame 12 is collapsed to the flat position when the recliner is triggered to dump the seat back forward.

In the stowed position shown in FIG. 8, the lower seat cushion sits upside down and the seat back sits flat with its back surface facing up and takes up the space formerly occupied by the lower seat cushion.

The underside of the cushion and the back of the seat back are made of or covered by some type of durable plastic. The risers, linkages, and tracks are all outboard of the cushion and seat back, i.e., the cushion and seat back are narrower than the rest of the seat so they can rotate between the risers, linkages, etc. The seat also provides a stowage area behind the seat back for the head restraint, which must be removed in order to stow the seat.

FIG. 10 illustrates the seat back frame 12 being pivoted about the second pivot point 16 to the table position. As mentioned previously, the back of the seat is preferably hard plastic with cup holders, etc. formed therein.

A further aspect of the invention is shown in FIGS. 11–14, and is an improvement over U.S. Pat. No. 5,269,581, which is hereby incorporated by reference in its entirety. This aspect of the invention is for a third row minivan seat, but could be used in the second row. The seat described in U.S. Pat. No. 5,261,581 is a stowable seat that stows into a floor cavity behind the seat. The seat back folds forward flat against the cushion, and then the entire seat rotates rearward 180 degrees to store into the floor cavity. The bottom surface of the cushion then becomes the load floor. The lower seat is a tubular design with a sheet metal stamping that covers the entire bottom surface and acts as the load floor.

With the present invention, the seat movement in order to stow the seat is the same, but the cushion (i.e., lower seat) construction is different. The lower seat can be a simple tubular design with elastomeric suspension and a thinner foam pad compared with the current seat design. (Because the current design uses a stamping, the foam must be thicker in order for the occupant to be comfortable and not to bottom out on the metal.) This will reduce the seat thickness in the stowed position and also save weight. Since the stowed seat thickness is thinner than that of the conventional seat, two shallow indentations could be made on the underside of the cushion to stow the head restraints.

In order to stow the seat assembly, the head restraints must be removed and stowed elsewhere. The head restraints may be stowed on the back of the seat backs. When the seat is stowed, a sliding cover can be slid over the seat to act as the load floor. This cover sits underneath the seat when the seat is in its upright position, or it could be slid over the cavity to act as an elevated load floor if the objects (such as suitcases, boxes, etc.) are too big to fit in the cavity. The occupants could also put stowable objects in the cavity, slide the cover over it, and use it either to hide the stowed objects or act as a second elevated load floor.

Figure 11:
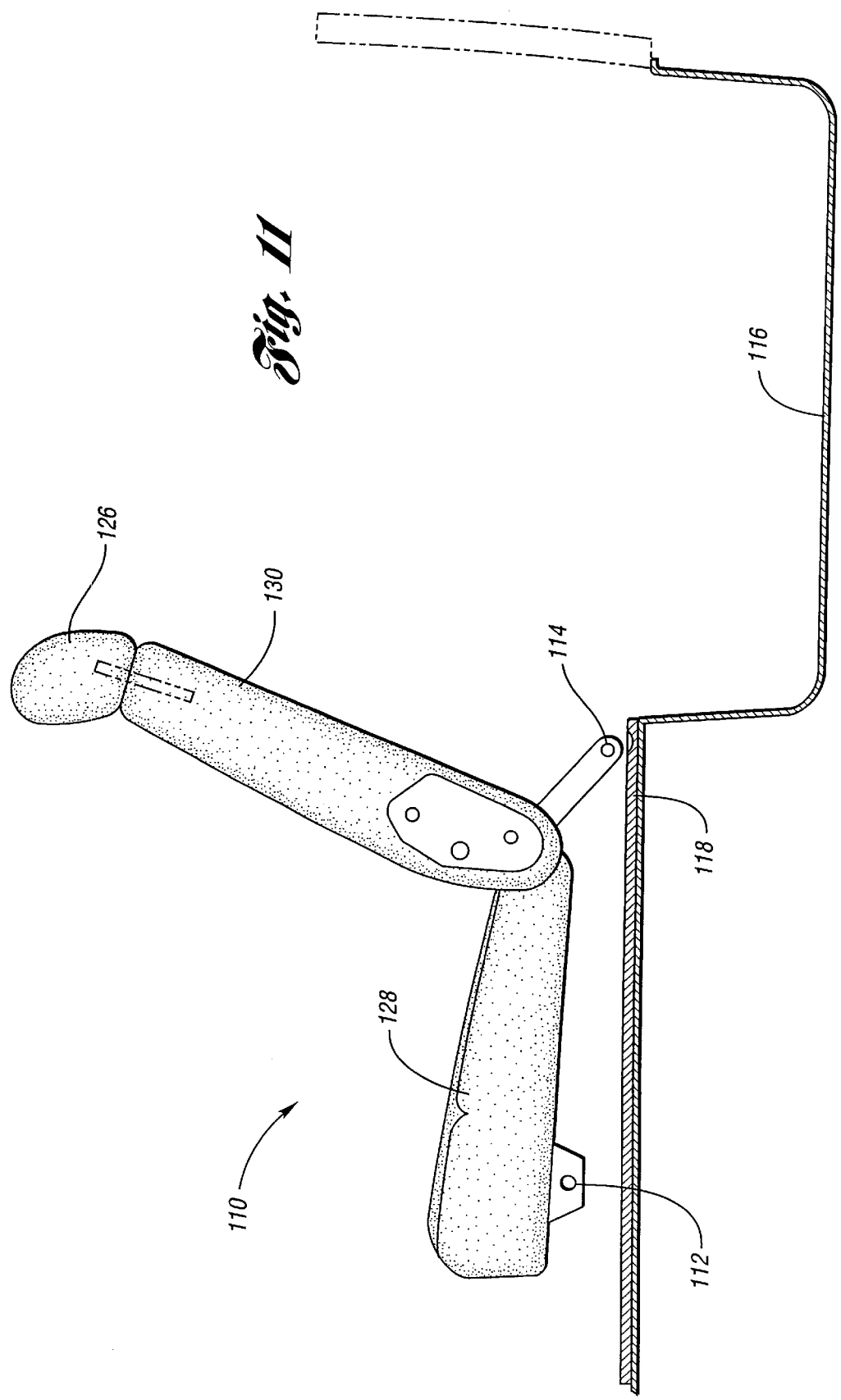
FIG. 11 shows a seat assembly in a vehicle in accordance with a second embodiment of the invention.

As shown in FIG. 11, the seat assembly 110 includes attachment joints 112, 114 which attach the seat assembly to the sides of the vehicle. The attachment joint 114 is operative as a pivot joint to enable pivotal movement of the seat assembly 110 to the collapsed position, shown in FIG. 13.

The seat assembly 110 is collapsible into a stowage cavity 116. A sliding cover 118 may be selectively positioned over the stowage cavity 116 to enclose various items 120, 122 within the cavity 116, or to enclose the collapsed seat assembly 110 within the cavity 116.

Figure 12:
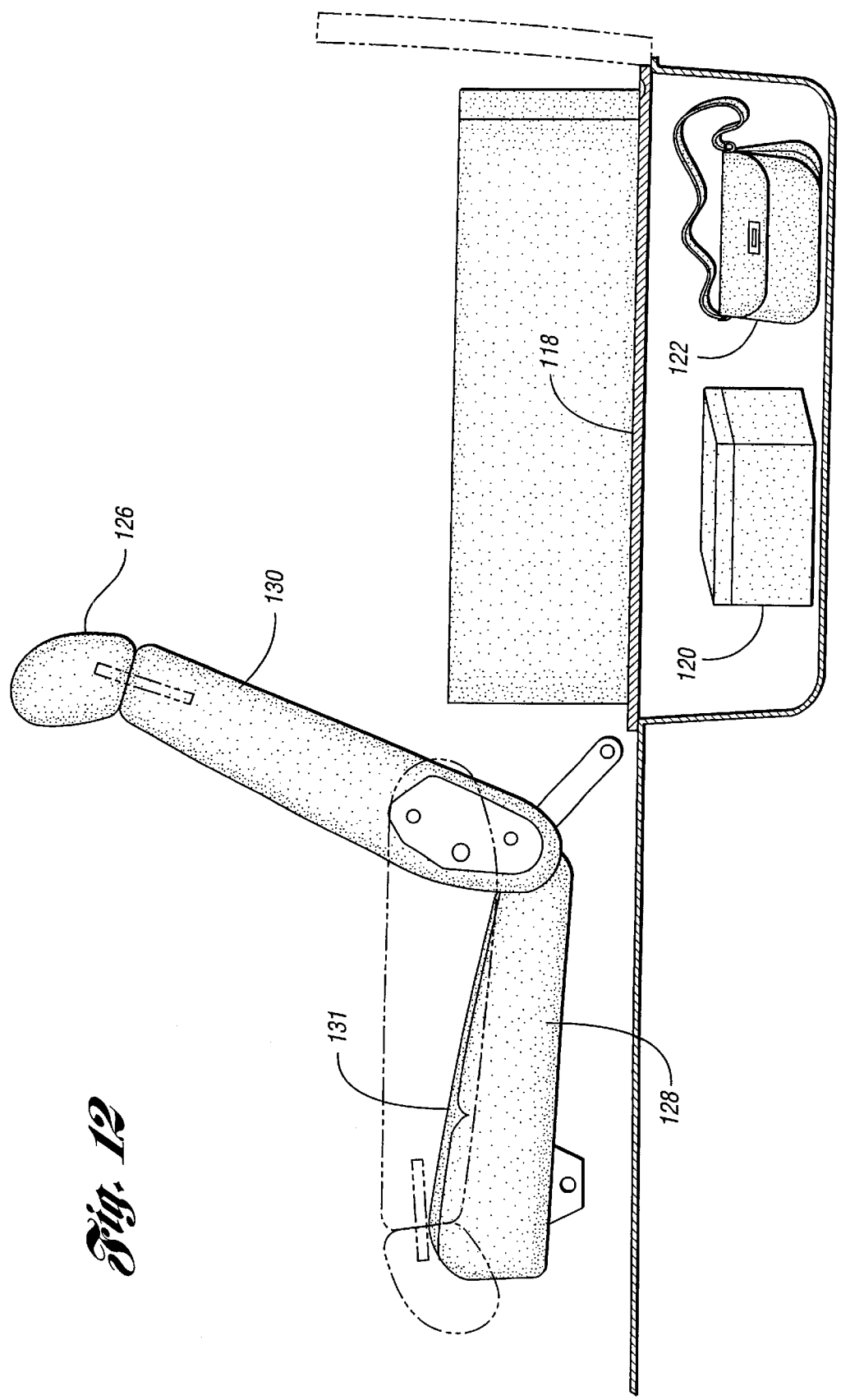
FIG. 12 shows the seat assembly of FIG. 11 with a stowage cavity filled with various items.

As shown in FIG. 12, when the seat back 130 is collapsed against the lower seat 128, the top surface 131 of the cushion of the lower seat 128 is compressed to reduce the overall thickness of the collapsed assembly. FIG. 14 shows a storage pocket 125 for storing the headrest 126 on the underside of the lower seat 128.

While the best modes for carrying out the invention have been described in detail, those familiar with the art to which this invention relates will recognize various alternative designs and embodiments for practicing the invention without departing from the spirit and scope of the invention as defined in the appended claims.

What is claimed is:

1. A collapsible seat assembly comprising:

first and second risers supported on a vehicle floor;

first and second movable supports pivotally connected to the first and second risers, respectively, by first and second parallelogram linkages, wherein each movable support has a front end and a rear end;

a lower seat cushion pan having a front end and a rear end wherein the front end of the lower seat cushion pan is pivotally connected to the front ends of the movable supports;

a seat back and recliner mechanism pivotally connected to the rear ends of the movable supports, wherein the lower seat cushion pan and seat back are pivotally collapsible forward to substantially horizontal positions in which the pan and seat back are substantially flush and parallel with each other to maximize cargo space in the vehicle and wherein the front end of the lower seat cushion pan is forward of the front of the lower seat cushion wherein the seat is collapsed.

2. The collapsible seat assembly of claim 1, wherein said lower seat cushion pan and seat back are narrower in width than the spacing between the first and second risers so that the lower seat cushion pan and seat back are positioned between the risers when collapsed.

3. The collapsible seat assembly of claim 1, wherein said first and second parallelogram linkages are collapsed rearward in the vehicle when the lower seat cushion pan and seat back are collapsed forward.

4. The collapsible seat assembly of claim 1, wherein said back surfaces of said lower seat cushion pan and seat back face upward when collapsed.

5. The collapsible seat assembly of claim 1, wherein the seat back is pivotally connected to the recliner mechanism for selective movement to a table position.

6. The collapsible seat assembly of claim 1, wherein said first and second risers are supported on a pair of fore-and-aft tracks.

7. The collapsible seat assembly of claim 1, wherein said lower seat cushion pan includes a releasable hook for selectively releasing the lower seat cushion pan for forward pivotal movement.

8. A collapsible seat assembly comprising:

first and second moveable supports pivotally connected with respect to a vehicle floor by first and second parallelogram linkages, wherein each movable support has a front end and a rear end;

a lower seat cushion pan having a front end and a rear end wherein the front end of the lower seat cushion pan is pivotally connected to the front ends of the movable supports;

a seat back and recliner mechanism pivotally connected to the rear ends of the movable supports, wherein the lower seat cushion pan and seat back are pivotally collapsible forward to substantially horizontal positions to maximize cargo space in the vehicle and wherein the front end of the lower seat cushion pan is forward of the front of the lower seat cushion when the seat is collapsed.

9. The collapsible seat assembly of claim 8 wherein said first and second parallelogram linkages are pivotally connected to first and second risers, respectively, supported on the vehicle floor, and the first and second risers are supported on a pair of fore-aft tracks.

10. The collapsible seat assembly of claim 8 wherein said lower seat cushion pan and seat back are narrower in width than the spacing between the first and second risers so that the lower seat cushion pan and seat back are positioned between the risers when collapsed.

* * * * *